Nov. 16, 1965     B. CYZER     3,217,720
TOOTHBRUSH WITH LIQUID CONTAINER
Filed Sept. 11, 1961     2 Sheets-Sheet 1

INVENTOR
BERNARD CYZER
BY
OSTROLENK, FABER, GERB & SOFFEN
ATTORNEYS

Nov. 16, 1965  B. CYZER  3,217,720
TOOTHBRUSH WITH LIQUID CONTAINER
Filed Sept. 11, 1961  2 Sheets-Sheet 2
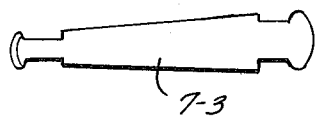
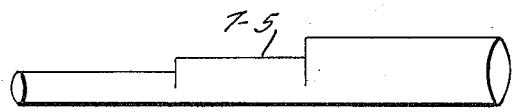
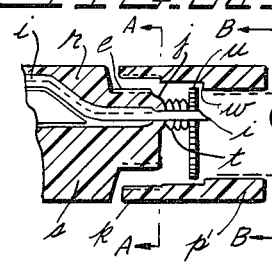
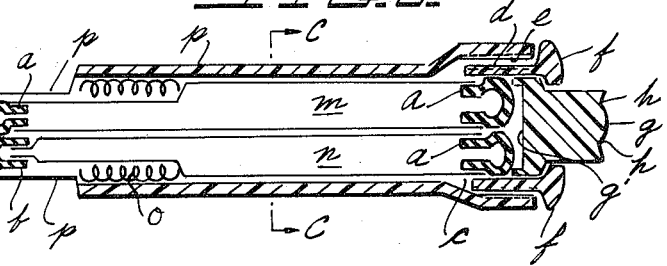
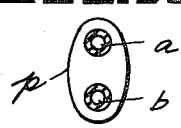
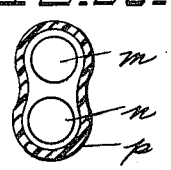
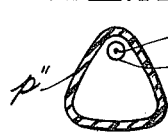
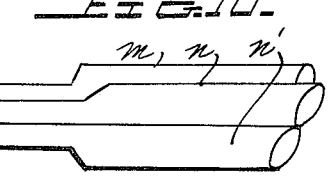
INVENTOR
*BERNARD CYZER*
BY
*OSTROLENK, FABER, GERB & SOFFEN*
*ATTORNEYS*

United States Patent Office 3,217,720
Patented Nov. 16, 1965

3,217,720
TOOTHBRUSH WITH LIQUID CONTAINER
Bernard Cyzer, Amidar 10, Tel Aviv, Israel
Filed Sept. 11, 1961, Ser. No. 137,462
Claims priority, application Israel, Sept. 13, 1960, 14,375
4 Claims. (Cl. 132—84)

Toothbrushes are known in which a cavity provided in the handle is connected with the brush head by a feed duct, and means are provided for squeezing a pasty dentifrice, treating liquid dentifrice, mouthwash, or the like (all of which treating liquids will collectively be referred to herein as "liquid dentifrice" for short), stored in the cavity, through the feed duck and into the clearances between the bristles or other brushing elements.

In a known toothbrush of this kind, the cavity is cylindrical and a piston mounted on a knob-operated spindle is movable into the feed-duct. In this and similar toothbrushes, the liquid dentifrice is not sufficiently sealed off from the air, and it is therefore apt to be contaminated by germs or other impurities carried by the air, as well as to trickle or seep out of the container of its own accord. The invention has the object of providing a toothbrush provided with a supply of liquid dentifrice accommodated in the brush-handle (to be called hereinafter a "toothbrush of the kind referred to") which is free from the drawbacks stated above.

The invention consists of a toothbrush of the kind referred to, comprising at least one treating-liquid container, provided with an outlet closed by a self-sealing closure member, which container is lodged in a cavity located in a part of the toothbrush connected to the brush-head by a feed-duct; a hollow needle in conjunction with the feed-duct; an operating member adapted to be actuated so as to bear against a resilient wall portion of the container and to shift the container towards the feed-duct, thereby urging the closure member of the container against the needle-tip for piercing the container in order to absorb a certain amount of the liquid dentifrice, which at the same time has been concentrated in the forward region of the container, and to pressure squeeze this certain amount of liquid into the brush-head; and biasing means for returning the container to its starting position when the operating member is released.

The container may be made from any suitable material, e.g. plastic, rubber or the like. In a preferred embodiment of the invention, it comprises a rigid part with open bottom and neck portions, which are closed respectively by a bottom cap having a resilient neck seal. The neck seal may be in the form, for example, of a membrane stretched across the mouth or of a plug of resilient material shaped correspondingly hollow in its inside and inserted in the mouth and bottom openings.

The present invention may be combined with the advantageous features of my invention described and claimed in the copending application "Toothbrush with Shuttingly, Oscillatingly and Rotatingly Movable Cleaning and Massaging Elements," Ser. No. 137,169, filed Sept. 11, 1961, now U.S. Patent No. 3,129,449. Accordingly, the sockets of the swivelling bristle-groups or other brushing elements in the brush-head shown therein may be used as distributing chambers into which the liquid dentifrice is delivered from the feed-duct in order to be distributed to the individual groups or bristles or equivalent brushing elements.

The invention is illustrated by way of example only, in the accompanying drawings in which:

FIGURES 7-1 through 7-5 show various shapes of containers together with their various closures, as follows: FIGURE 7-1 is a broken off section of a container, the neck and bottom ends of which are identically closed by a rubber-like closure comprising a portion $b$ outwardly the end of the container and a portion $b'$ shaped like a belt.

Figure 2:
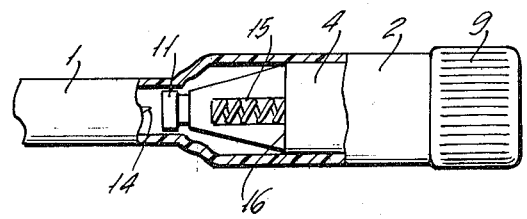
FIGURE 2 is a top plan view corresponding to FIGURE 1, with part of the handle wall being broken away.
Figure 3:
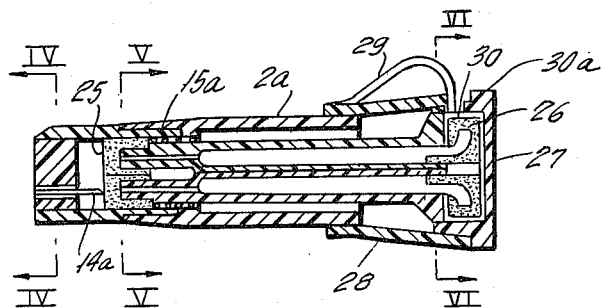
FIGURE 3 is a fragmentary axial section of a toothbrush according to a second embodiment of the invention.
Figure 4:
FIGURES 4, 5 and 6 are cross-sections on lines IV—IV, V—V and VI—VI, respectively, of FIGURE 3.
Figure 5:
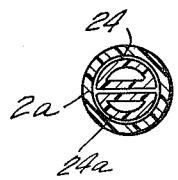
Figure 6:
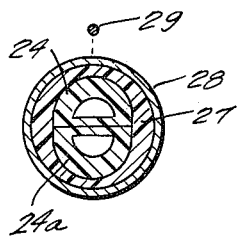

FIGURE 7-2 shows a closure identical for both container ends. This closure $a$ forms a hollow shaped plug, which is constructed like a belt $a'$, forming an inside closure. If suitable, these two different closures can be variously applied to the two container ends, e.g. as is shown in FIGURE 8;

FIGURE 7-3 shows a container having funnel form; FIGURE 7-4 shows a container consisting of two or more steps, the single steps dispersing centrically; FIGURE 7-5, on the contrary, shows a container, the steps of which define a straight bottom line, the form itself being particularly adaptable for a unit having more than one container (FIGURES 8 and 9). Each of the containers shown may be regidly or resiliently manufactured. It is usually discarded as soon as it is empty, and particularly after the wearing out of the closures, but may also be refilled after the renewal of closures. Each of the exemplified forms is open at both ends and sealed by closures at both ends. Alternatively, each of these forms can be supplied only with one opening, i.e. with only one aperture, sealed up by a closure in the form of a belt.

FIGURE 8 is a top-plan view of an axial section of a toothbrush handle, according to the third embodiment of this invention.

FIGURE 8a is a top-plan view of an axial section of the fragment of the brush-head of the above-mentioned second invention.

FIGURE 9 shows various arrangements for use in conjunction with FIGURE 8 to provide several liquid containers within the toothbrush handle.

FIGURE 9a is a cross-section of FIGURE 8a along the lines A—A. FIGURE 9b is a cross-section of FIGURE 8 along the lines B—B. FIGURE 9c is a cross-section along the lines C—C of FIGURE 8.

FIGURE 10 and cross-sectional views 10a through 10c show an alternative arrangement for use in conjunction with FIGURE 8 to provide several liquid containers within the toothbrush handle. Cross-sections 10a through 10c correspond generally to those shown in FIGURES 9a through 9c, but modified in accordance with FIGURE 10.

Figure 1:
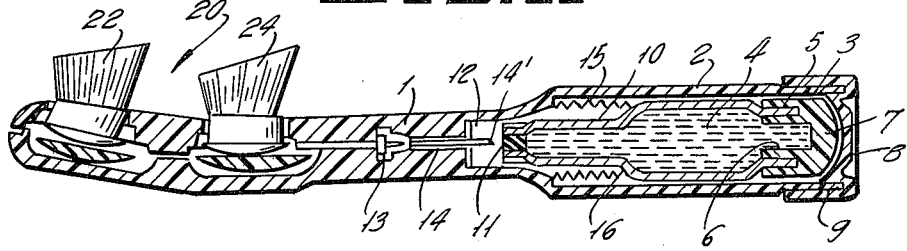
FIGURE 1 is a fragmentary axial section of a toothbrush according to a first embodiment of the invention, showing the handle with a dentifrice container and part of the feed-duct with the hollow needle.

The toothbrush shown in FIGURES 1 and 2 has a handle 1 merging into the brush-head generally shown as 20, which is of the type shown in aforementioned U.S. Patent No. 3,129,449 and includes swiveling brush elements 22, 24. The rear part 2 of the handle is of a wider diameter and forms a substantially cylindrical cavity 3 for the reception of an ampule-shaped container 4 for the liquid dentifrice. The bottom end of the container is open and merges into a duct 5 in which the stem 6 of a mushroom-shaped bottom cap 7 of rubber is snugly inserted. Instead of having the rounded shape shown, the rubber bottom cap may have an oval, flat or angular form. This cap is covered by a concave disc 8 which is propped up against the inwardly turned rim of an open-ended retaining sleeve 9 screwed on the rear end of the part 2 of the handle. The front portion of the container includes an elongated neck 10 whose mouth is sealed by a cap-shaped membrane 11 of rubber or the like, tightly stretched over the mouth. The neck extends into a chamber 12 formed in the transition between the interior of the handle 1 and rear part 2. A narrow feed duct 13 is provided in the handle part 1. This duct houses a rearwardly pointing needle 14 whose pointed end 14' is located opposite the cap 11. The term "needle" is used in this specification and the appended claims for the designation of any tubular duct having a pointed end capable of penetrating through the closure member of the dentifrice container 4. Two compression springs 15 are interposed between shoulders 16 provided at the front part of the container 4 where the latter merges into the neck 10, and inner abutments within the handle cavity at the transition between the wider handle part 2 and the narrower handle part 1. These springs tend to hold the container in its rearmost position in which the needle 14 stands clear of the cap 11.

Pressure exerted on the disc 8 has a dual effect: the container is shifted frontwards against the action of springs 15, whereby the needle 14, which cannot yield, is made to pierce the cap 11; and at the same time the cap 7 is pressed inwardly through the disc 8 compressing the container. The entry of needle 14 inside the container discharges the liquid dentifrice in the form of a small splash or a drop which is pressed through the hollow needle 14 into the feed duct 13, in order to reach the brush-head, the brushing elements and various other points of distribution.

The embodiment according to FIGURES 3–6 comprises two containers 24, 24a. Each of them has substantially a semi-circular cross-section, and they are disposed with their flat sides lying closely against each other. Their front ends are closed by caps or plugs 25, 25a of rubber or the like. The rear ends of both containers are stopped by resilient plugs or caps 26, held by friction in an exteriorly-threaded cap 27. The latter is screwed into the tapped wider rear end of a conically tapered sleeve 28. Sleeve 28 and the cap 27 form a unit, wherein relative turning movement between the cap 27 and sleeve 28 is prevented by a flexible locking tongue 29. Locking tongue 29 is fixed at one end to the outer face of the sleeve 28, while its free end can be inserted in openings 30, 30a provided in the sleeve and cap, respectively, which openings are brought into mutual angular register and locked by member 29. The unit is slidable along the axis of the handle 2a which is provided with suitable threads. Spring 15a, coiled around the narrower front parts of the containers 24, 24a, presses the entire unit formed by the sleeve 28, cap 27 and the two containers rearwards. The needle 14a is in this case disposed off-center and in the angular position of the container unit relative to the handle faces the plug or cap 25 of container 24 and in another angular position thereof (displaced by 180° relative to the former) the plug or cap 25a of container 24a. In analogous manner, three or even four containers can be provided. The arrangement of two or more containers may serve the purpose of putting at the disposal of the user two or more different treating liquids for alternative use, or a reserve supply of a single liquid. There may also be a container for special purposes as e.g. for the disinfection of the brush-head together with all its brushing elements or for a necessary treating liquid, as prescribed in the case of an illness of the mouth cavity. The compressibility of the bottom cap remains substantially constant for each individual container. It is therefore possible to design the container bottom for the delivery of a constant dose each time the bottom is being pressed upon one or two drops of any other desired quantity. Moreover, means may be provided for locking the container in the position of delivery with the needle penetrating through the closure member. In this locked position of the container the delivery of liquid to the brush elements can be repeated as many times as desired without intermediate return of the container to its starting position. Such locking means may be e.g. in the form of a conventional catch or the like adapted to engage a corresponding recess or projection of the retainer.

Instead of a round form of the toothbrush handle, as shown in FIGURES 1–6, the handle may be of an oval, flat or other form. Referring to FIGURES 8, 8a, the device consists of an oval case as handle, which extends to a round form at the upper end. This round extension is provided with an internal thread. Along the handle there are two containers $m, n$ which are sealed up with resilient closures at the top and bottom ends. The closure at the top end $a$ is a hollow, belt-shaped stopper and is situated in the inside of the aperture, and as are the bottom closures $a, a'$. On the contrary the closure $b$ seals up the top end outwardly in the form of a cap. Between the narrower and wider parts of the handle $p$, there are the springs $o$. Inwardly the round extension $c$ above the belts and within cavity $g'$, there is a push-button $g$ having round notch $h$. The unit is closed by screwing of the closure part $f$ with its thread $d$ into the thread $e$.

The device of FIGURES 8 and 8a operates in a similar manner, with a difference being that in FIGURES 8 and 8a the brush-head and handle are separate units to be fitted together when used, whereas FIGURES 1 and 2 show a unitary construction of the brush-head and handle. Also, in FIGURES 8 and 8a it is seen that the needle of the feed-duct $i$ is eccentrically situated as in the embodiment of FIGURE 3. The thinner part of the handle $p$ is inserted in the top, which comprises the end of the head brush $p'$, and the top $p''$, with the side part of the liquid container directed towards the corresponding feed-duct $i$. The case $p'$ as well as the case $p''$ is provided for the insertion of the handle of the brush-head. Owing to the fitted belt-shaped clossures $a$ and $b$ and at the same time to the placement of the elevation $j$ supporting the needle, there originates here first the compression inside the container, exercised from above by the push-button $g$ on the bottom closures, then the relaxation in the form of a certain small splash or drop from the end of the feed-duct $i$. If the push-button is not immediately released, there then follows a more intense pressure. The belt-shaped closure of the neck-end $a$ meets the resistance of the elevation $j$, and the compression and relaxation and supply of the food-duct are repeated. In this embodiment, the belt of the closure $a$, FIGURE 8, is pressed on the sharp end of the feed-duct $i$, FIGURE 8a. The immediately following pressure of the belt and the consequent penetrating of the liquid dentifrice in the feed-duct $i$ is carried out by a deeper (more intense) pressure on the bottom end of the container and by the cooperation of the belt $a$ against an operating elevation $j$. After the use of this toothbrush, its two parts are again separated.

FIGURE 8a shows a fragment of a brush-head of my above-mentioned application Ser. No. 137,619. There are illustrated two parts of brush-heads $r, s$, put together, and between them runs the feed-duct $i$. The parts put together form a rounded design, provided with a thread $l$. Around the sharp end of the feed-duct there is the elevation $j$ and around the latter there is the spring $t$, on which there lies the round disc $u$, which leans upon the step $w$. The sharp end of the feed-duct protrudes a little through the hole of the disc. On the thread $l$ there is screwed the design $p'$ with its thread $k$ and forms an oval case.

Upon pressure of the push-button $g$, there ensues the above-mentioned proceedings. With the exertion of the additional, deeper pressure (of the push-button $g$), the surface of the belt $a$ is pressed on the disc $u$, and at the same time the spring $t$ together with the disc $u$ offer resistance. A similar compression is also obtained without the spring $t$ and disc $u$ arrangement when the surface of the belt $a$ is directly pressed on elevation $j$.

The space for the free movement of the push-button $g$ may be constructed thus, that the button is caught in with its notched edge in a certain spot under the closure edge $f'$ and then released again by a recess movement.

Although in the foregoing specification I have described preferred embodiments of my novel invention, many variations and modifications will now become apparent to those skilled in the art, and I prefer therefore to be limited not by the specific disclosure contained herein but only by the appended claims.

I claim:

1. A toothbrush of the kind referred to, comprising a brush head, a plurality of treating-liquid containers for selective delivery of liquid to said brush-head; each of said containers provided with an outlet closed by a self-sealing closure member; said toothbrush having a container receiving cavity; said containers movably lodged in said cavity; a feed-duct within said toothbrush communicating between said container cavity and said brush-head; a hollow needle in conjunction with the feed-duct including a piercing point facing said self-closure member; an operating member; means for actuating said operating member to bear against a resilient wall portion of said container and to shift the container towards the feed-duct, whereby said piercing point pierces said closure member of said container; said cavity including a wall surface positioned to abut said container upon the entry of said needle into said container; said wall surface preventing further forward movement of said container, whereby continued actuation of said operating member compresses said container a predetermined amount to squeeze a predetermined amount of liquid through said needle to said feed-duct into said brush-head; and biasing means for returning said container to its starting position when said operating member is released, whereat said needle is removed from said container; said self-sealing closure member constructed to effectively seal the access to said container upon said removal of the needle; said plurality of containers assembled into a unit, and provided with means for turning the unit about its longitudinal axis relative to the part of the toothbrush in which the containers are located and wherein the hollow needle is so disposed off center relative to the axis of the container unit, such that each container mouth can be selectively shifted in front of the needle by the appropriate turning of the unit, the other of said container remaining sealed while said operating member is actuated.

2. A toothbrush according to claim 1 provided with means for releasably locking the container in the operating position in which the needle has penetrated the closure member.

3. A toothbrush according to claim 1 wherein the brush-head and brush handle form two separate units, means releasably uniting said units for use and permitting separation after to form two units.

4. A toothbrush according to claim 1, wherein the brush-head includes a plurality of swivelling brush elements, sockets of said swivelling brush elements having distribution chambers for the liquid dentifrice delivered from said container, through said needle and into said feed-duct.

References Cited by the Examiner

UNITED STATES PATENTS

| | | | |
|---|---|---|---|
| 1,854,352 | 4/1932 | Thomas | 222—153 |
| 1,855,572 | 4/1932 | Gabriel | 132—84 |
| 2,349,005 | 5/1944 | Roe. | |
| 2,667,986 | 2/1954 | Perelson | 222—80 X |
| 2,699,167 | 1/1955 | Raiche | 128—216 |
| 2,807,818 | 10/1957 | Taylor | 132—84 |
| 2,820,979 | 1/1958 | Herter | 132—84 |
| 3,021,850 | 2/1962 | Smith et al. | 132—84 |

RICHARD A. GAUDET, *Primary Examiner.*

LAVERNE D. GEIGER, ROBERT E. MORGAN,
*Examiners.*